(12) United States Patent
Ikeda et al.

(10) Patent No.: US 8,992,669 B2
(45) Date of Patent: Mar. 31, 2015

(54) HYDROGEN SEPARATION MEMBRANE MODULE AND HYDROGEN SEPARATION METHOD USING SAME

(75) Inventors: Masakazu Ikeda, Tokyo (JP); Shunsuke Maekawa, Tokyo (JP); Kaori Takano, Tokyo (JP)

(73) Assignees: JX Nippon Oil & Energy Corporation, Tokyo (JP); Japan Petroleum Energy Center, Tokyo (JP)

( * ) Notice: Subject to any disclaimer, the term of this patent is extended or adjusted under 35 U.S.C. 154(b) by 126 days.

(21) Appl. No.: 13/700,549

(22) PCT Filed: May 31, 2011

(86) PCT No.: PCT/JP2011/062507
§ 371 (c)(1),
(2), (4) Date: Jan. 29, 2013

(87) PCT Pub. No.: WO2011/152408
PCT Pub. Date: Dec. 8, 2011

(65) Prior Publication Data
US 2013/0213228 A1    Aug. 22, 2013

(30) Foreign Application Priority Data
May 31, 2010   (JP) ................................ P2010-124265

(51) Int. Cl.
*B01D 53/22* (2006.01)
*B01D 63/06* (2006.01)
*C01B 3/50* (2006.01)

(52) U.S. Cl.
CPC ............... *B01D 53/22* (2013.01); *B01D 63/06* (2013.01); *C01B 3/503* (2013.01); *C01B 2203/0405* (2013.01); *B01D 2313/08* (2013.01)
USPC .................. 95/55; 95/56; 96/4; 96/10; 96/11

(58) Field of Classification Search
USPC .................................. 96/4, 10, 11; 95/55, 56
See application file for complete search history.

(56) References Cited

U.S. PATENT DOCUMENTS 2,609,059 A * 9/1952 Manson .......................... 96/10
5,013,437 A * 5/1991 Trimmer et al. .................. 95/55
(Continued)

FOREIGN PATENT DOCUMENTS

JP         7-112923      12/1995
JP      2009-184883   *   8/2009
(Continued)

OTHER PUBLICATIONS

International Search Report, mail date is Sep. 6, 2011.
(Continued)

*Primary Examiner* — Jason M Greene (57) ABSTRACT

The hydrogen separation membrane module according to the present invention is used for separating hydrogen from a gas to be treated containing hydrogen, and is provided with a tubular hydrogen separation membrane being selectively permeable to hydrogen, a casing for the hydrogen separation membrane, an insertion member being arranged on the inside of the hydrogen separation membrane and having an outer surface that defines a flow path of the gas to be treated together with an inner surface of the hydrogen separation membrane, a gas supply port for supplying the gas to be treated to the inside of the hydrogen separation membrane, a gas discharge port for discharging a non-permeating gas that does not permeate the hydrogen separation membrane, from a downstream side of the flow path, and a hydrogen discharge port provided in the casing, for discharging hydrogen having permeated the hydrogen separation membrane.

5 Claims, 7 Drawing Sheets

(56) References Cited

U.S. PATENT DOCUMENTS

| | | |
|---|---|---|
| 6,451,090 B2* | 9/2002 | Monereau et al. ............. 96/10 |
| 6,537,352 B2* | 3/2003 | Edlund et al. .................. 96/4 |
| 7,393,384 B2* | 7/2008 | Gopalan et al. ............... 96/10 |
| 2003/0183080 A1* | 10/2003 | Mundschau .................. 95/55 |
| 2008/0163753 A1* | 7/2008 | Bossard et al. ............... 95/55 |
| 2010/0005960 A1* | 1/2010 | Noda ........................... 95/56 |

FOREIGN PATENT DOCUMENTS

| | | |
|---|---|---|
| JP | 2009-226403 | 10/2009 |
| JP | 2010-95413 | 4/2010 |

OTHER PUBLICATIONS

English Translation of International Preliminary Report on Patentability, mail date is Jan. 17, 2013.

* cited by examiner

Prior Art

HYDROGEN SEPARATION MEMBRANE MODULE AND HYDROGEN SEPARATION METHOD USING SAME

TECHNICAL FIELD

The present invention relates to a hydrogen separation membrane module for separating hydrogen from a gas to be treated containing hydrogen, and to a hydrogen separation method using the same.

BACKGROUND ART

With the growing attention being focused on global warming and other environmental issues in recent years, research and development has actively been performed on new forms of energy having a minimal burden on the environment. One example of these new forms of energy is hydrogen, and fuel cells using hydrogen as fuel, for example, are already being used.

The following Patent Literature 1 describes a technology for separating hydrogen from a gas containing hydrogen, and more specifically, describes a hydrogen purification device provided with a tubular palladium alloy membrane.

CITATION LIST

Patent Literature

Patent Literature 1: Japanese Examined Patent Publication No. H7-112923

SUMMARY OF INVENTION

Technical Problem

Hydrogen is obtained by, for example, steam reforming of methane (see Formula (1) below). Hydrogen yield can be enhanced by supplying the carbon monoxide generated together with hydrogen by steam reforming to a water gas shift reaction (see Formula (2) below).

$$CH_4 + H_2O \rightarrow CO + 3H_2 \tag{1}$$

$$CO + H_2O \rightarrow CO_2 + H_2 \tag{2}$$

In the case of producing hydrogen by supplying city gas or kerosene to a reformer, a mixed gas is normally generated in the reformer that contains hydrogen and other gases. Examples of these other gases include carbon dioxide, carbon monoxide, methane and steam. Although varying according to the types of raw feedstock and reaction conditions, the hydrogen concentration of city gas may be about 70% by volume, while the carbon dioxide concentration may be about 30% by volume.

According to studies conducted by the inventors of the present invention, when a mixed gas containing a large amount of gas other than hydrogen as described above is treated with a conventional hydrogen separation membrane module, it is not possible to attain a sufficiently high recovery rate with a single treatment, even if highly pure hydrogen gas is able to be obtained. This results in the problem of low separation efficiency. This is presumed to be because conventional hydrogen separation membrane modules are designed with the primary objective of further increasing the purity of a gas to be treated having a hydrogen concentration in excess of 99% by volume.

An object of the present invention is to provide a hydrogen separation membrane module capable of separating highly pure hydrogen gas from a gas to be treated containing hydrogen with adequate efficiency, and a hydrogen separation method that uses that modules

Solution to Problem

The present invention provides a hydrogen separation membrane module for separating hydrogen from a gas to be treated containing hydrogen, provided with: a tubular hydrogen separation membrane that is selectively permeable to hydrogen, a casing for the hydrogen separation membrane, an insertion member that is arranged on the inside of the hydrogen separation membrane and has an outer surface that defines a flow path of the gas to be treated together with an inner surface of the hydrogen separation membrane, a gas supply port for supplying the gas to be treated to the inside of the hydrogen separation membrane, a gas discharge port for discharging a non-permeating gas that does not permeate the hydrogen separation membrane, from the downstream side of the flow path, and a hydrogen discharge port provided in the casing, for discharging hydrogen that has permeated the hydrogen separation membrane.

In the above-mentioned hydrogen separation membrane module, the flow path of the gas to be treated is defined by the inner surface of the hydrogen separation membrane and the outer surface of the insertion member. By supplying a gas to be treated to this flow path and allowing the gas to be treated to flow so as to follow the inner surface of the hydrogen separation membrane, hydrogen molecules contained in the gas to be treated are ensured sufficient opportunities for contacting the hydrogen separation membrane. Consequently, the amount of hydrogen discharged from the hydrogen discharge port can be adequately increased, and highly pure hydrogen gas can be obtained at an adequately high recovery rate.

In the present invention, the insertion member has a gas feed tube, and the gas supply port and the gas discharge port are preferably partitioned by the gas feed tube. As a result, cross flow of the gas to be treated from the gas supply port to the gas discharge port can be prevented.

In the present invention, an opening in one end of the tubular hydrogen separation membrane is preferably closed with a closure plate, and the outer surface of the insertion member preferably extends to the vicinity of the closure plate. According to this configuration, a flow path can be formed so as to follow the inner surface of the hydrogen separation membrane from one end of the hydrogen separation membrane which is closed to the other end thereof, and opportunities for hydrogen molecules contained in the gas to be treated to contact the hydrogen separation membrane can be more adequately ensured.

The present invention also provides a hydrogen separation method that uses the above-mentioned hydrogen separation membrane module, and comprises supplying a gas to treated to a flow path defined by the inner surface of a tubular hydrogen separation membrane and the outer surface of an insertion member, and allowing hydrogen contained in the gas to be treated to permeate from the inside to the outside of the tubular hydrogen separation membrane.

According to the hydrogen separation method according to the present invention, by supplying a gas to be treated to the above-mentioned flow path and allowing the gas to be treated to flow so as to follow the inner surface of the hydrogen separation membrane, hydrogen molecules contained in the gas to be treated are ensured sufficient opportunities for contacting the hydrogen separation membrane. Furthermore, the flow rate of the gas to be treated is preferably adjusted to generate laminar flow in the flow path in order to obtain highly pure hydrogen gas at an adequately high recovery rate.

Advantageous Effects of Invention

According to the present invention, highly pure hydrogen gas can be separated from a gas to be treated containing hydrogen with adequate efficiency.

DESCRIPTION OF EMBODIMENTS

The following provides a detailed explanation of preferred embodiments of the present invention with reference to the drawings.

<Hydrogen Separation Membrane Module>

First Embodiment

Figure 1:
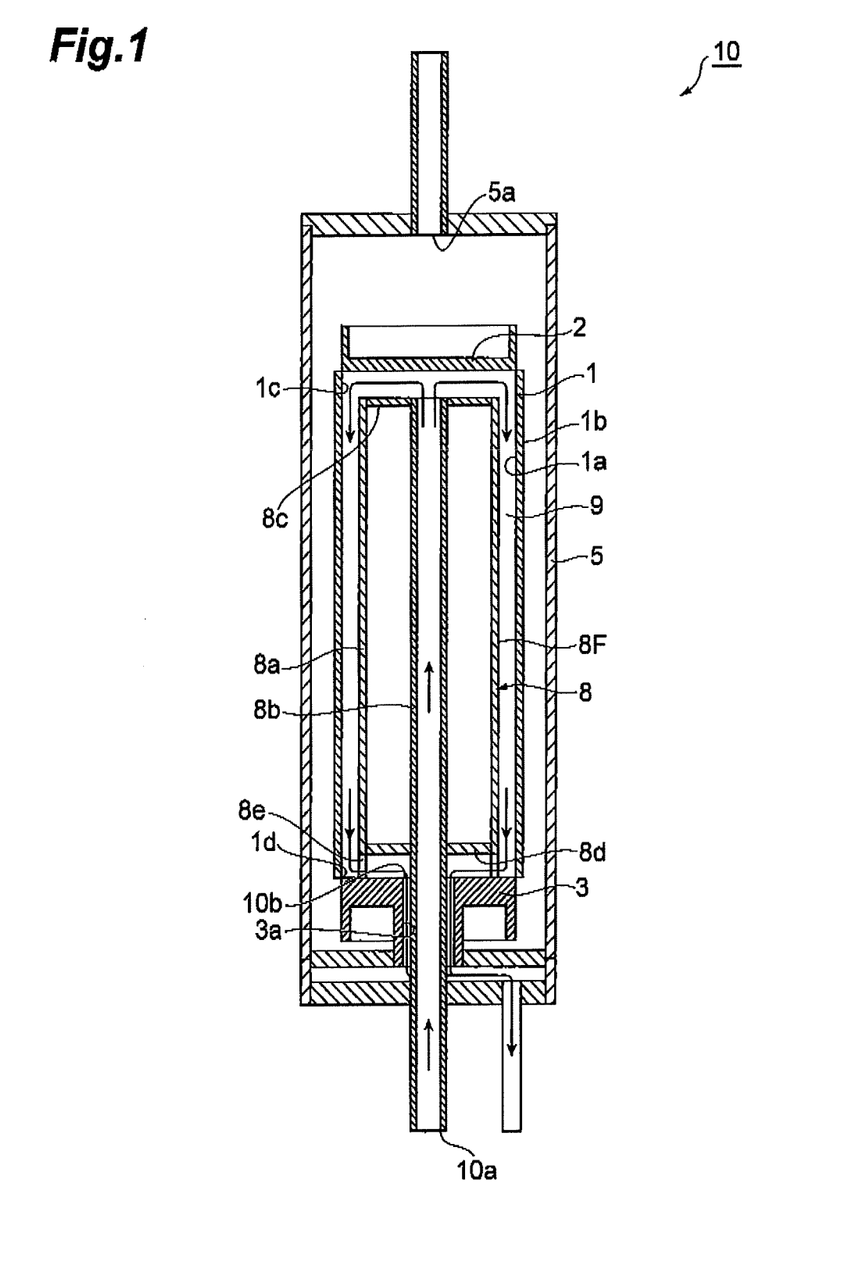
FIG. 1 is a schematic cross-sectional view showing an embodiment of a hydrogen separation membrane module according to the present invention.

A hydrogen separation membrane module (to simply be referred to as the "module") 10 shown in FIG. 1 is for separating hydrogen from a gas to be treated containing hydrogen. The module 10 is provided with a cylindrical hydrogen separation membrane 1 that is selectively permeable to hydrogen, a casing 5 that houses the hydrogen separation membrane 1, and an insertion member 8 arranged on the inside of the hydrogen separation membrane 1. Examples of materials used for the casing 5 and the insertion member 8 include stainless steel, Inconel and Hastelloy.

The hydrogen separation membrane 1 has the property of being selectively permeable to hydrogen. Selective permeability to hydrogen is presumed to occur as a result of hydrogen molecule that has contacted an inner surface 1a of the hydrogen separation membrane 1 dissociating into hydrogen atoms under conditions of a temperature of about 200° C. to 600° C., the hydrogen atoms moving to an outer surface 1b by a difference in hydrogen partial pressure between the inner surface 1a side and the outer surface 1b side as a driving force, and the hydrogen atom bonding with other hydrogen atom on the outer surface 1b to become a hydrogen molecule.

Examples of materials that compose the hydrogen separation membrane 1 include palladium, alloys of palladium and copper and alloys of palladium and silver. Other elements may be added in addition to the above-mentioned palladium or palladium alloys in order to inhibit decreases in hydrogen permeation performance of the hydrogen separation membrane 1. Examples of other elements include Mg, Ti, Mn, Fe, Co, Ni, Cu, Y, Nb, Mo, Ag, Au, Pt, Rh, Ru, In, Sn, Pr, Sm and Gd.

The hydrogen separation membrane 1 may be a dense membrane composed only of the above-mentioned materials, or may be a dense thin membrane composed of the above-mentioned materials supported on a porous body. In the case of the former, the thickness of the hydrogen separation membrane 1 is preferably 2 μm or more and more preferably 5 μm to 25 μm from the viewpoints of mechanical strength and hydrogen permeability. In the case of the latter, the thickness of the thin membrane is preferably 2 μm or more and more preferably 5 μm to 25 μm from the viewpoint of processability.

In cases where the hydrogen separation membrane 1 comprises the dense thin membrane composed of the above-described materials and the porous body supporting the membrane thereon, the replacement of gaseous species tends to be inhibited on the side of the porous body and, thus, it is preferable for a dense thin membrane to be the side contacted with a mixed gas (gas to be treated), and a porous body to be the side contacted with permeated hydrogen.

The hydrogen separation membrane 1 is preferably cylindrical, and the inner diameter thereof is preferably 10 mm or more and more preferably 25 mm to 40 mm. The length of the hydrogen separation membrane 1 is preferably 50 mm or more and more preferably 80 mm to 1000 mm.

An opening 1c on the distal side of the hydrogen separation membrane 1 is closed by a closure plate 2. On the other hand, a plate 3 having a through hole 3a is attached to an opening 1d on the proximal side of the hydrogen separation membrane 1. The gas to be treated is supplied to the inside of the hydrogen separation membrane 1 through this through hole 3a. Examples of materials used for the closure plate 2 and the plate 3 include stainless steel, Inconel and Hastelloy. The junctions between the hydrogen separation membrane 1, and the closure plate 2 and the plate 3 are kept airtight, and they can be joined by soldering or electron beam welding.

The insertion member 8 has an inner tube 8a having an outer diameter slightly smaller than the inner diameter of the hydrogen separation membrane 1, a gas feed tube 8b inserted into the through hole 3a of the plate 3, the distal end of which is located in the vicinity of the closure plate 2, an occlusion plate 8c and an occlusion plate 8d that occlude an annulus formed by the inner tube 8a and the gas feed tube 8b on the distal side and on the proximal side respectively. By arranging the insertion member 8 having the above-mentioned configuration on the inside of the hydrogen separation membrane 1, the flow path 9 for the gas to be treated is defined by an outer surface 8F of the inner tube 8a and the inner surface 1a of the hydrogen separation membrane 1.

The inner tube 8a of the insertion member 8 extends to the vicinity of the closure plate 2. The distance between the distal end of the inner tube 8a (upper surface of the occlusion plate 8c) and the closure plate 2 is preferably 0.1 mm to 10 mm and more preferably 0.1 min to 5 mm.

The distance between the outer surface 8F of the inner tube 8a and the inner surface 1a of the hydrogen separation membrane 1 is preferably 0.1 mm to 30 mm, more preferably 1 mm to 25 mm and even more preferably 1 mm to 20 mm. If this distance is less than 0.1 mm, hydrogen separation efficiency tends to become inadequate when the flow rate of the gas to be treated is large, while if this distance exceeds 30 mm, opportunities for hydrogen molecules contained in the gas to be treated to contact the hydrogen separation membrane 1 tend to decrease.

A notch 8e is provided on the distal end side of the gas feed tube 8b. Gas (non-permeating gas) that has passed through the flow path 9 is transferred to a gas discharge port 10b through the notch 8e. In the present embodiment, the proximal end of the gas feed tube 8b serves as a gas supply port 10a, and the annulus between the through hole 3a and the gas feed tube 8b serves as the gas discharge port 10b. As shown in FIG. 1, although the insertion member 8 is hollow between the inner tube 8a and the gas feed tube 8b, this portion is not required to be hollow.

The casing 5 houses the hydrogen separation membrane 1. A hydrogen discharge port 5a is provided in the upper end surface of the casing 5. Hydrogen that has permeated the hydrogen separation membrane 1 is able to be discharged from the hydrogen discharge port 5a.

The following effects are demonstrated by the module 10 configured in the manner described above. Specifically, in the module 10, as indicated by the arrows in FIG. 1, the gas to be treated is able to flow through the flow path 9 defined by the inner surface 1a of the hydrogen separation membrane 1 and the outer surface 8F of the inner tube 8a of the insertion member 8. As a result, adequate opportunities are ensured for hydrogen molecules contained in the gas to be treated to contact the hydrogen separation membrane 1. Consequently, the amount of hydrogen discharged from the hydrogen discharge port 5a can be adequately increased, and highly pure hydrogen gas can be obtained at an adequately high recovery rate.

In addition, in the module 10, the gas supply port 10a and the gas discharge port 10b are partitioned by the gas feed tube 8b of the insertion member 8. As a result, cross flow of the gas to be treated from the gas supply port 10a to the gas discharge port 10b can be prevented.

Moreover, in the module 10, the opening 1c on the distal end of the hydrogen separation membrane 1 is closed by the closure plate 2, and the inner tube 8a of the insertion member 8 extends to the vicinity of the closure plate 2. As a result of employing this configuration, the flow path 9 can be formed to as to follow the inner surface 1a of the hydrogen separation membrane 1 from the upper end to the lower end of the hydrogen separation membrane 1, thereby ensuring adequate opportunities for hydrogen molecules contained in the gas to be treated to contact the hydrogen separation membrane 1.

Second Embodiment

Figure 2:
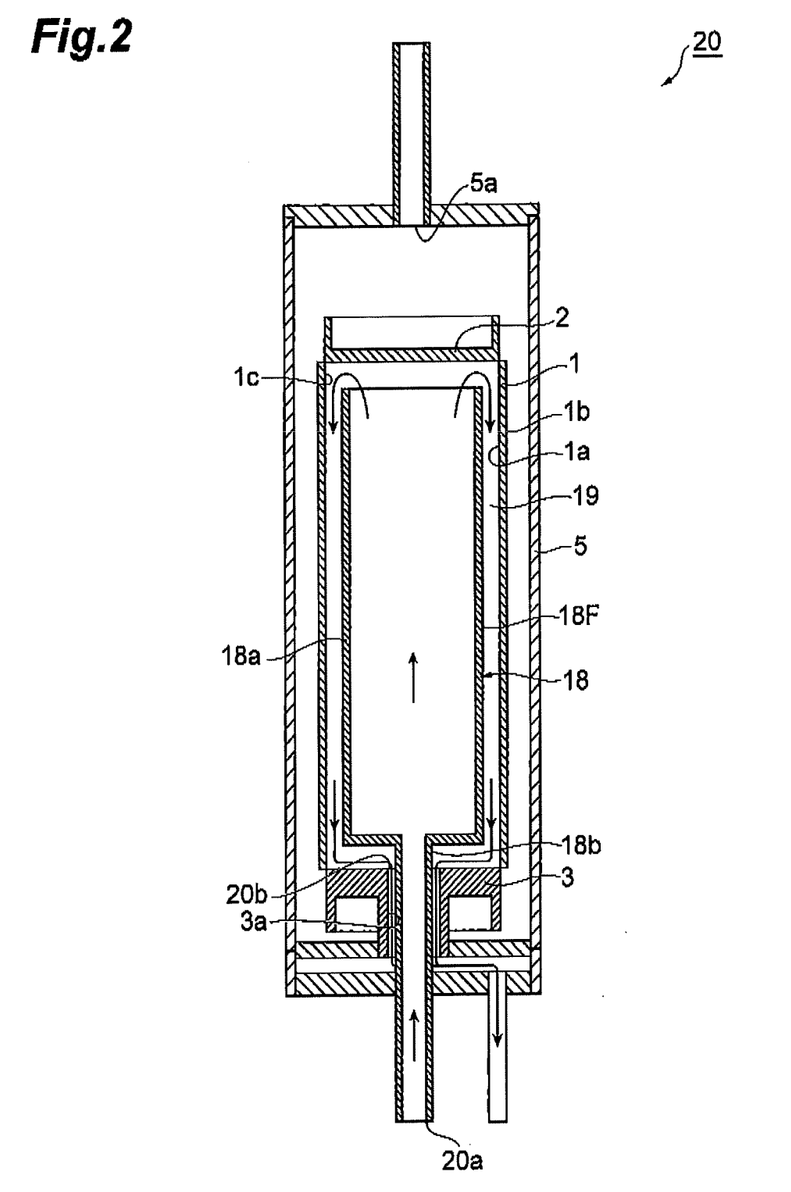
FIG. 2 is a schematic cross-sectional view showing another embodiment of a hydrogen separation membrane module according to the present invention.

A module 20 shown in FIG. 2 is provided with the cylindrical hydrogen separation membrane 1 that is selectively permeable to hydrogen, the casing 5 that houses the hydrogen separation membrane 1, and an insertion member 18 provided on the inside of the hydrogen separation membrane 1. The module 20 differs from the above-mentioned module 10 in that, instead of the insertion member 8, it is provided with the insertion member 18 having the configuration described below. The following provides an explanation of this difference focusing primarily on the insertion member 18.

As shown in FIG. 2, the insertion member 18 is composed of an inner tube 18a and a gas feed tube 18b serving as the proximal end thereof. In the present embodiment, a flow path 19 for the gas to be treated is defined by an outer surface 18F of the inner tube 18a and the inner surface 1a of the hydrogen separation membrane 1. The inner tube 18a has a larger outer diameter than the outer diameter of the gas feed tube 18b. The proximal end of the inner tube 18a preferably extends to the vicinity of the plate 3 as long as non-permeating gas passes between the insertion member 18 and the plate 3 and reaches a gas discharge port 20b. In the present embodiment, the proximal end of the gas feed tube 18b serves as a gas supply port 20a, and an annulus between the through hole 3a and the gas feed tube 18b serves as a gas discharge port 20b.

The inner tube 18a of the insertion member 18 extends to the vicinity of the closure plate 2. The distance between the distal end of the inner tube 18a and the closure plate 2 is preferably 0.1 mm to 10 mm and more preferably 0.1 mm to 5 mm. In addition, the distance between the outer surface 18F of the inner tube 18a and the inner surface 1a of the hydrogen separation membrane 1 is preferably 0.1 mm to 30 mm, more preferably 1 mm to 25 mm, and even more preferably 1 mm to 20 mm.

The following effects are demonstrated by the module 20 configured in the manner described above. Specifically, in the module 20, as indicated by the arrows in FIG. 2, the gas to be treated is able to flow through the flow path 19 defined by the inner surface 1a of the hydrogen separation membrane 1 and the outer surface 18F of the inner tube 18a of the insertion member 18. As a result, adequate opportunities are ensured for hydrogen molecules contained in the to be treated to contact the hydrogen separation membrane 1. Consequently, the amount of hydrogen (permeating gas) discharged from the hydrogen discharge port 5a can be adequately increased, and highly pure hydrogen gas can be obtained at an adequately high recovery rate.

In addition, in the module 20, the gas supply port 20a and the gas discharge port 20b are partitioned by the gas feed tube 18b of the insertion member 18. As a result, cross flow of the gas to be treated from the gas supply port 20a to the gas discharge port 20b can be prevented.

Moreover, in the module 20, the opening 1c on the distal end of the hydrogen separation membrane 1 is closed by the closure plate 2, and the inner tube 18a of the insertion member 18 extends to the vicinity of the closure plate 2. As a result of employing this configuration, the flow path 19 can be formed to as to follow the inner surface 1a of the hydrogen separation membrane 1 from the upper end to the lower end of the hydrogen separation membrane 1, thereby ensuring even more adequate opportunities for hydrogen molecules contained in the gas to be treated to contact the hydrogen separation membrane 1.

<Hydrogen Separation Method>

The following provides an explanation of a hydrogen separation method that uses the hydrogen separation membrane module according to the present invention. Here, although a hydrogen separation method that uses the module 10 according to the first embodiment is used as an example, the hydrogen separation method can be carried out in the same manner using the module 20.

The hydrogen separation method according to the present embodiment comprises supplying a gas to be treated to the flow path 9 defined by the inner surface 1a of the hydrogen separation membrane 1 and the outer surface 8F of the insertion member 8, and allowing hydrogen contained in the gas to be treated to permeate from the inside to the outside of the cylindrical hydrogen separation membrane 1.

Although there are no particular limitations on the hydrogen concentration of the gas to be treated, the hydrogen concentration of the gas to be treated is preferably 50% by volume to less than 100% by volume and more preferably 70% by volume to less than 100% by volume. The hydrogen separation membrane module according to the present invention is characterized by allowing highly pure hydrogen to be efficiently obtained from a gas to be treated having a comparatively low hydrogen concentration. For example, the hydrogen concentration of the gas to be treated may be 95% by volume or less, 90% by volume or less, 85% by volume or less, or 80% by volume or less.

Examples of gases other than hydrogen contained in the gas to be treated include carbon dioxide, carbon monoxide, methane, nitrogen and steam. For example, an example of a gas to be treated having a carbon dioxide concentration of 20 vol % to 30 vol % is a mixed gas obtained by supplying a synthesis gas (mixed gas containing hydrogen and carbon monoxide) to a water gas shift reaction. This gas may further contain 0.1 vol % to 5 vol % of carbon monoxide and 0.1 vol % to 5 vol % of methane, and may additionally contain steam at 0.1 vol % to 60 vol % of the gas to be treated.

Although varying according to the type and performance of the hydrogen separation membrane 1, the temperature of the hydrogen separation membrane 1 during use is preferably 200° C. to 600° C. and more preferably 300° C. to 500° C. Pressure inside the hydrogen separation membrane 1 is preferably 0.1 MPa to 5 MPa and more preferably 0.5 MPa to 4 MPa. On the other hand, pressure outside the hydrogen separation membrane 1 is preferably at least 0.1 MPa lower and more preferably at least 2 MPa lower than the pressure inside the hydrogen separation membrane 1.

Figure 7:
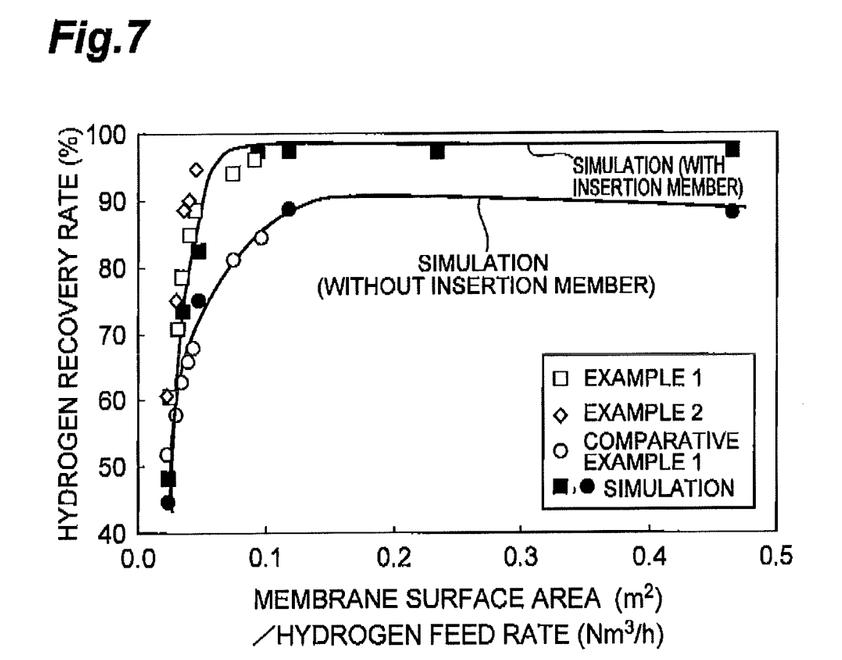
FIG. 7 is a graph indicating results for examples, a comparative example and simulations.

A ratio A/B between an area A ($cm^2$) of the inner surface $1a$ of the hydrogen separation membrane 1 and an amount B ($Nm^3/hr$) of hydrogen contained in the gas to be treated per unit time is preferably 0.05 or more and more preferably 0.09 to 0.11 from the viewpoint of achieving an adequately high recovery rate (see FIG. 7). If the value of A/B is less than 0.05, the hydrogen recovery rate tends to become inadequate. If the value of A/B exceeds 0.11, this means that the performance of the module 10 is excessive relative to the flow rate of the gas to be treated.

In the flow path 9 in the module 10, the flow of the gas to be treated is preferably laminar flow in order to obtain highly pure hydrogen gas at an adequately high recovery rate. Laminar flow can be generated in the flow path 9 by adjusting the flow rate of the gas to be treated or, depending on the case, suitably setting the flow path cross-sectional area of the flow path 9.

According to the hydrogen separation method according to the present embodiment, by supplying a gas to be treated to the flow path 9 and allowing the gas to be treated to flow so as to follow the inner surface $1a$ of the hydrogen separation membrane 1, opportunities are adequately ensured for hydrogen molecules contained in the gas to be treated to contact the hydrogen separation membrane 1.

Figure 3:
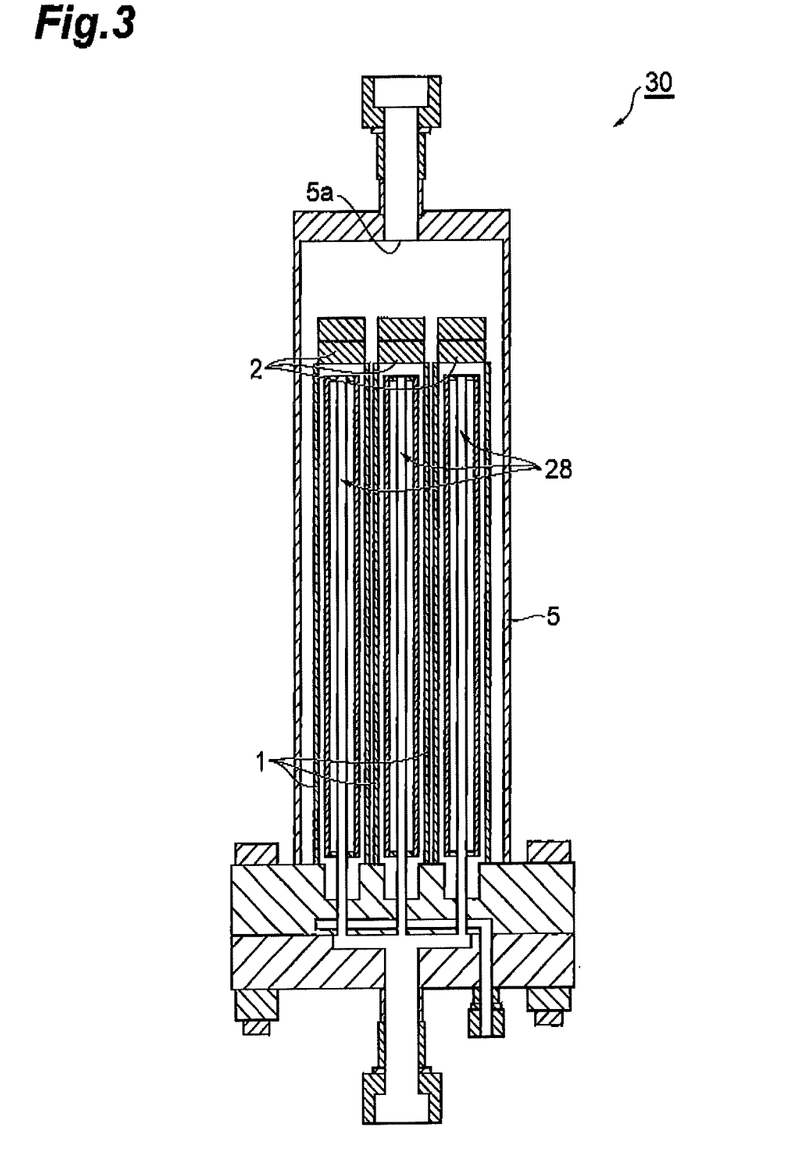
FIG. 3 is a cross-sectional view showing a hydrogen separation membrane module provided with a plurality of hydrogen separation membranes in a casing.
Figure 4:
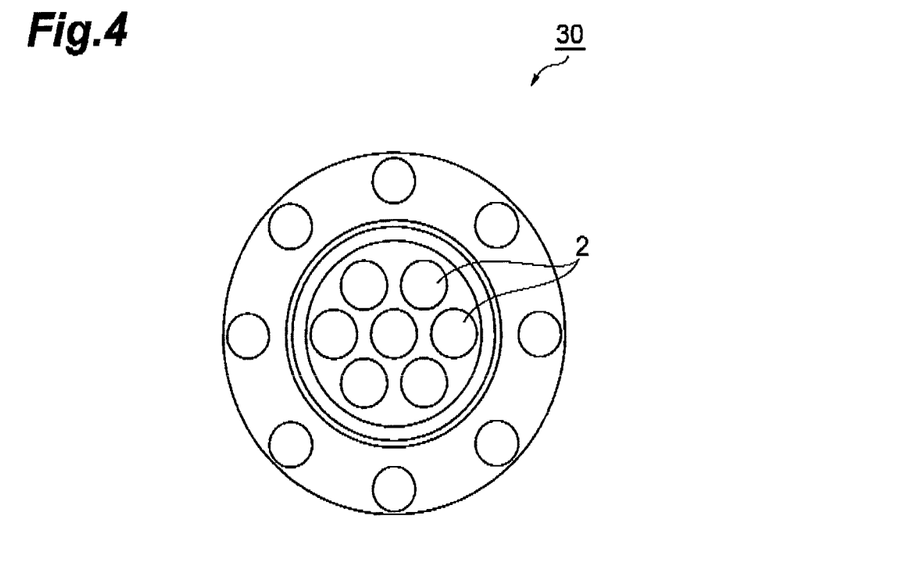
FIG. 4 is a top view showing the hydrogen separation membrane shown in FIG. 3 with the casing removed.

Although the above has provided a detailed explanation of preferred embodiments of the present invention, the present invention is not limited to the above-mentioned embodiments. For example, although the case of installing a single hydrogen separation membrane 1 in the case 5 was exemplified in the above-mentioned embodiments, as shown in FIGS. 3 and 4, a plurality of the hydrogen separation membranes 1 may be installed in the casing 5. A module 30 shown in FIG. 3 has seven of the hydrogen separation membranes 1 in the casing 5 (see FIG. 4), and an insertion member 28 is inserted inside each of the hydrogen separation membranes 1. The insertion member 28 has the same configuration as the insertion member 8 according to the first embodiment, and extends to the vicinity of the closure plate 2 at the upper end of the hydrogen separation membrane 1. The number of the hydrogen separation membranes 1 installed in the casing 5 is not limited to seven. In addition, the configuration of the insertion member 28 may be the same as the insertion member 18 according to the second embodiment, or may be a combination of the insertion member 8 and the insertion member 18.

In addition, although a configuration in which the gas to be treated released from the distal end of the insertion member 8 or 18 towards the closure plate 2 simply flows into the flow path 9 or 19 was indicated as a preferable example in terms of ease of production, contrivances such as that described below may be made to the distal end of the hydrogen separation membrane 1. For example, a nozzle that delivers gas in an inclined direction relative to the lengthwise direction of the hydrogen separation membrane 1 may be provided on the distal end of the hydrogen separation membrane 1. As a result, the gas to be treated flows through the flow path 9 or 19 in the form of a spiral flow, thereby making it possible to expect an even higher hydrogen recovery rate.

In the present invention, a hydrogen separation membrane may be used with both ends open provided it employs a configuration in which the flow path is defined by the inner surface of the hydrogen separation membrane and the outer surface of the insertion member. In addition, the direction in which the gas to be treated flows may be opposite to that of the above-mentioned embodiments. The shape of the hydrogen separation membrane is not limited to that of a cylinder, but may also have an oval, rectangular or polygonal cross-section.

EXAMPLES

Hydrogen separation tests according to the following Examples 1 and 2 and Comparative Example 1 were carried out to confirm the effects of the hydrogen separation membrane according to the present invention and the hydrogen separation method using that hydrogen separation membrane.

Example 1

A module was fabricated having the same configuration as the module 10 shown in FIG. 1, and a hydrogen separation test was carried out with that module. The dimensions of the module according to the present example are shown in Table 1, and the evaluation criteria are shown in Table 2.

TABLE 1

| Casing | Inner diameter | 45.3 mm |
|---|---|---|
| Hydrogen separation membrane | Length | 92 mm |
| | Inner diameter | 32 mm |
| | Membrane surface area | 0.008 $m^2$ |
| | Membrane thickness | 22 μm |
| Inner tube | Outer diameter | 27.2 mm |
| | Inner diameter | 23.9 mm |
| | Distance from closure plate | 5 mm |
| Gas feed tube | Outer diameter | 6.4 mm |
| | Inner diameter | 4.5 mm |

TABLE 2

| Pressure | Supply pressure | | 2.0 MPaG |
|---|---|---|---|
| | $H_2$ permeation pressure | | 0.02 MPaG |
| Temperature | | | Approx. 300° C. |
| Feed gas flow rate | | | 150 NL/h to 500 NL/h |
| Feed gas composition | | $H_2$ | 70 vol % |
| | | $CO_2$ | 30 vol % |

Example 2

A module was fabricated having the configuration as the module 20 shown in FIG. 2, and a hydrogen separation test was carried out with that module. The dimensions and evaluation criteria of the module were the same as those of Example 1 (see Tables 1 and 2).

Comparative Example 1

Figure 5:
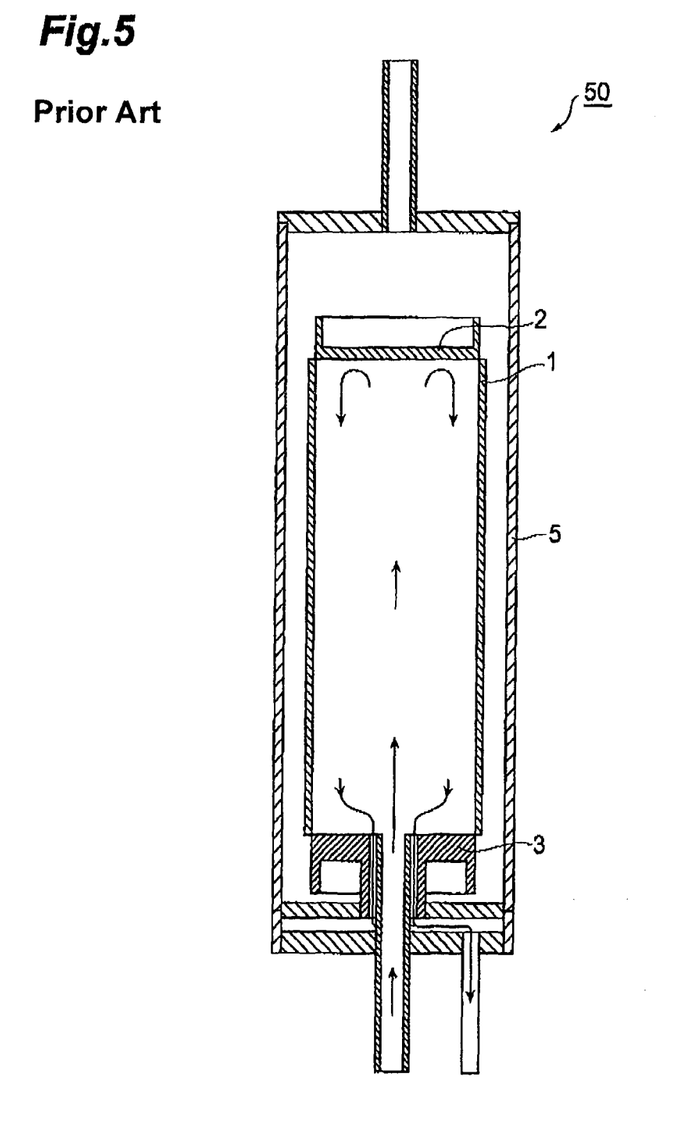
FIG. 5 is a schematic cross-sectional view showing an example of a conventional hydrogen separation membrane module.

A module was fabricated having the same configuration as the module 50 shown in FIG. 5, and a hydrogen separation test was carried out. The module 50 shown in FIG. 5 differs from the module 10 shown in FIG. 1 in that the insertion member 8 is not arranged on the inside of the hydrogen separation membrane 1. The dimensions (excluding the inner tube) and evaluation criteria of the module were the same as those of Example 1 (see Tables 1 and 2).

Figure 6:
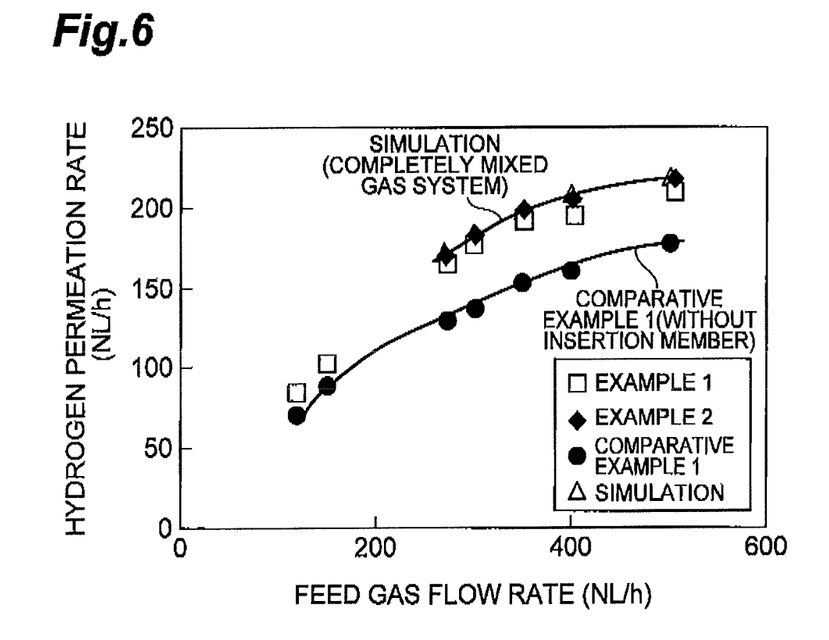
FIG. 6 is a graph indicating results for examples, a comparative example and a simulation.

The results obtained for Examples 1 and 2 and Comparative Example 1 are shown in FIGS. 6 and 7. FIG. 6 also shows calculation results (theoretical values) obtained with a process simulator (trade name: PRO/II, Invensys Process Systems, Inc.), while FIG. 7 also shows calculation results (theoretical values) obtained by computational fluid dynamics (CFD) (trade name: Flunet Ver. 12, Ansys, Inc.).

INDUSTRIAL APPLICABILITY

According to the present invention, highly pure en gas can be separated from a gas to be treated containing hydrogen with adequate efficiency.

REFERENCE SIGNS LIST

1: hydrogen separation membrane; 1a: inner surface of hydrogen separation membrane; 1b: outer surface of hydrogen separation membrane; 2: closure plate; 5: casing; 5a: hydrogen discharge port; 8, 18: insertion member; 8F, 18F: outer surface of inner tube (insertion member); 8a, 18a: inner tube; 8b, 18b: gas feed tube; 9, 19: flow path; 10, 20, 30: hydrogen separation membrane module; 10a, 20a: gas supply port; 10b, 20b: gas discharge port; 28: insertion member.

The invention claimed is:

1. A hydrogen separation membrane module for separating hydrogen from a gas to be treated containing hydrogen, comprising:
   a tubular hydrogen separation membrane being selectively permeable to hydrogen, the hydrogen separation membrane comprising a supported membrane supported on a porous body;
   a casing for the hydrogen separation membrane;
   an insertion member arranged on an inside of the hydrogen separation membrane and having an outer surface that defines a flow path of the gas to be treated together with an inner surface of the hydrogen separation membrane;
   a gas supply port for supplying the gas to be treated to the inside of the hydrogen separation membrane;
   a gas discharge port for discharging a non-permeating gas that does not permeate the hydrogen separation membrane, from a downstream side of the flow path; and
   a hydrogen discharge port provided in the casing, for discharging hydrogen having permeated the hydrogen separation membrane, wherein the porous body is only provided on a side of the hydrogen separation membrane that contacts the permeated hydrogen.

2. The hydrogen separation membrane module according to claim 1, wherein the insertion member has a gas feed tube, and the gas supply port and the gas discharge port are partitioned by the gas feed tube.

3. The hydrogen separation membrane module according to claim 1, wherein an opening in one end of the tubular hydrogen separation membrane is closed with a closure plate, and the outer surface of the insertion member extends to the vicinity of the closure plate.

4. A hydrogen separation method using the hydrogen separation membrane module according to claim 1, comprising:
   supplying the gas to be treated to the flow path defined by the inner surface of the tubular hydrogen separation membrane and the outer surface of the insertion member; and
   allowing hydrogen contained in the gas to be treated to permeate from the inside to the outside of the tubular hydrogen separation membrane.

5. The hydrogen separation membrane module according to claim 2, wherein an opening in one end of the tubular hydrogen separation membrane is closed with a closure plate, and the outer surface of the insertion member extends to the vicinity of the closure plate.

* * * * *